United States Patent
Luo et al.

(10) Patent No.: US 7,433,398 B2
(45) Date of Patent: Oct. 7, 2008

(54) EQUALIZATION FOR DMT AND OFDM COMMUNICATION SYSTEMS

(75) Inventors: Fa-Long Luo, San Jose, CA (US); David Chou, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 656 days.

(21) Appl. No.: 10/889,530

(22) Filed: Jul. 12, 2004

(65) Prior Publication Data
US 2006/0007998 A1    Jan. 12, 2006

(51) Int. Cl.
*H03K 5/159* (2006.01)
(52) U.S. Cl. .................................................. 375/232
(58) Field of Classification Search ................ 375/229, 375/230, 231, 232; 333/18, 288; 708/300, 708/322, 323; 379/340, 398
See application file for complete search history.

(56) References Cited
U.S. PATENT DOCUMENTS

2002/0167997 A1* 11/2002 Kim et al. .................... 375/229
2004/0086027 A1*  5/2004 Shattil ......................... 375/146
2004/0174932 A1*  9/2004 Warke et al. ................. 375/232
2005/0190871 A1*  9/2005 Sedarat ........................ 375/350

\* cited by examiner

*Primary Examiner*—Sam K Ahn
(74) *Attorney, Agent, or Firm*—Patterson & Sheridan, LLP

(57) ABSTRACT

The invention provides a DMT or OFDM equalization system that deals with each tone not only separately, but also globally, which provides better overall performance. In the inventive system, only M+T variables are required to be determined, where M is the number of tones and T represents the number of SIRF taps. The invention defines a matrix R, in which optimal coefficients are found as the eigenvector corresponding to the smallest eigenvalue of the matrix R. The dynamic range of all variables is limited in a system in accordance with the present invention, which provides ease of hardware implementation. Furthermore, the inventive system retains the advantages of per-tone equalization by providing a smoother signal-to-noise ratio (SNR) distribution function versus synchronization delay. In addition, no effort is wasted on the equalization of unused tones, because it is unnecessary to determine the coefficients for unused tones.

30 Claims, 3 Drawing Sheets

EQUALIZATION FOR DMT AND OFDM COMMUNICATION SYSTEMS

FIELD OF THE INVENTION

This invention relates generally to equalization for receivers used in discrete multi-tone (DMT) and orthogonal frequency-division multiplexing (OFDM) communication systems and, in particular, to a combination of time-domain and frequency-domain equalization, and is more particularly directed toward a system that provides proper equalization filter coefficients for both time-domain and frequency domain equalization through application of global optimization criteria.

BACKGROUND OF THE INVENTION

Digital modulation schemes are increasingly employed to provide high data throughput over inherently band-limited channels. A prominent example of this is the DSL (digital subscriber line) service provided over telephone lines. Another prominent example is wireless internet communication, such as under the Institute for Electrical and Electronics Engineers (IEEE) 802.11 standards.

Since telephone lines are known to provide a narrow-band channel, digital modulation schemes are often employed to increase the data rate over channels of this type. Quadrature amplitude modulation (QAM) systems, in which orthogonal symbols are transmitted, have been very successful in providing high data rates in moderate symbol rate transmissions. In order to optimize the transmission through quadrature schemes over narrow band channels, various types of orthogonal frequency-division multiplexing (OFDM), have been used. In an OFDM system, the available bandwidth is divided into subcarriers that enable easier transmission and reception. The physical layer of IEEE 802.11(a) utilizes such OFDM.

A popular type of OFDM is known as digital multi-tone (DMT). In a DMT system, the total channel bandwidth is divided into subcarriers (frequency bands), but the channel capacity of each subcarrier is generally determined individually during modem or other transceiver training. In other words, each subcarrier may have a different QAM constellation, which allows some subbands to have higher effective data rates than others. As mentioned above, DMT is very similar to the OFDM used in wireless applications, such as in transceivers for IEEE 802.11, and any reference herein to DMT should be understood to mean and include OFDM or any other form of frequency division multiplexing.

One of the advantages of DMT or OFDM is that comparatively less complicated equalization can be employed. Data rates are lower within the subbands, which tends to reduce the overall problem of intersymbol interference (ISI) and thus make the necessary equalizers less complex.

A problem arises in current implementations, however, wherein a number of time-domain equalization techniques are used to derive the coefficients of a short impulse response filter ("SIRF") that is used to provide the time domain equalization ("TEQ"). One disadvantage is that available channel capacity in such a system is not a smooth function of synchronization delay. In fact, for some particular synchronization delays, channel capacity can be highly degraded. This occurs principally because the TEQ algorithms of present systems do not use individual frequency information, and thus end up treating all tones in the same way.

Consequently, a need arises for an effective equalization system and method that overcomes these problems in the prior art, while maintaining high performance under reasonable complexity, and that may be implemented with existing hardware technologies.

SUMMARY OF THE INVENTION

These needs and others are satisfied by the equalization system, method and apparatus of the present invention. When compared with known per-tone systems, the inventive scheme deals with each tone not only separately, but also globally, which provides better overall performance. In the inventive system, a comparatively much smaller number of variables are required to be determined, only M+T variables, where M is the number of tones (DMT or OFDM carrier frequencies or subbands) and T represents the number of SIRF taps. This is in sharp contrast with prior art implementations, in which substantially more variables are required to be computed, namely, M×T variables. The dynamic range of all variables is limited in a system in accordance with the present invention, which provides advantages in ease of hardware implementation. Furthermore, the inventive system retains the advantages of per-tone equalization by providing a smoother signal-to-noise ratio (SNR) distribution function versus synchronization delay. In addition, no effort is wasted on the equalization of unused tones, because it is unnecessary to determine the coefficients for unused tones and one may simply allow related matrix variables to be zero, as discussed in greater detail below ($A_i=0$).

In accordance with one aspect of the present invention, an equalization method is proposed for a digital communication receiver utilizing frequency division multiplexing, such as DMT or OFDM modulation with M subbands. The present invention provides an equalization method for communication having frequency division multiplexing using a plurality of frequency subbands, comprising: (a) performing time domain equalization using a first plurality of coefficients to form a time domain equalized signal, such as by using a T-taps SIRF filter, as discussed in greater detail below; (b) converting the time domain equalized signal into a frequency domain signal; (c) separating the frequency domain signal into the plurality of frequency subbands; and (d) performing frequency domain equalization for each frequency subband of the plurality of frequency subbands using a second plurality of coefficients, the second plurality of coefficients having one coefficient for each frequency subband of the plurality of frequency subbands, e.g., equalizing using M one-tap FIR filters, as discussed in greater detail below.

The first plurality of coefficients and the second plurality of coefficients are jointly or globally determined in the exemplary embodiments. The first plurality of coefficients are determined in the form of a matrix W and the second plurality of coefficients are determined in the form of a matrix D, based on a known transmitted training sequence $X_i$ and a received and frequency transformed training sequence $Y_i$, by constraining the first plurality of coefficients W to $W^H W=1$, where H is a Hermitian Transpose. The first plurality of coefficients W are determined as an eigenvector corresponding to a smallest eigenvalue of a matrix R, where $$R = \sum_{i=1}^{M} A_i^H A_i \text{ and}$$

$$A_i = \left( I - X_i \frac{X_i^H}{X_i^H X_i} \right) Y_i,$$

where I is the unity matrix, or as a vector in a minor subspace spanned by a plurality of eigenvectors corresponding to a plurality of comparatively smaller eigenvalues of the matrix R. The second plurality of coefficients D are determined from a third plurality of coefficients in the form of a matrix C, where $$C_i = \frac{1}{d_i} \text{ and } C_i = (X_i^H X_i)^{-1} X_i^H Y_i W = \frac{X_i^H Y_i W}{X_i^H X}.$$

Various embodiments include processor-based receivers and, as discussed in detail below, adaptive computing-based receivers. Other embodiments include, for example, software and other machine-readable media.

Numerous other advantages and features of the present invention will become readily apparent from the following detailed description of the invention and the embodiments thereof, from the claims and from the accompanying drawings.

DETAILED DESCRIPTION OF THE EXEMPLARY EMBODIMENTS

Figure 1:
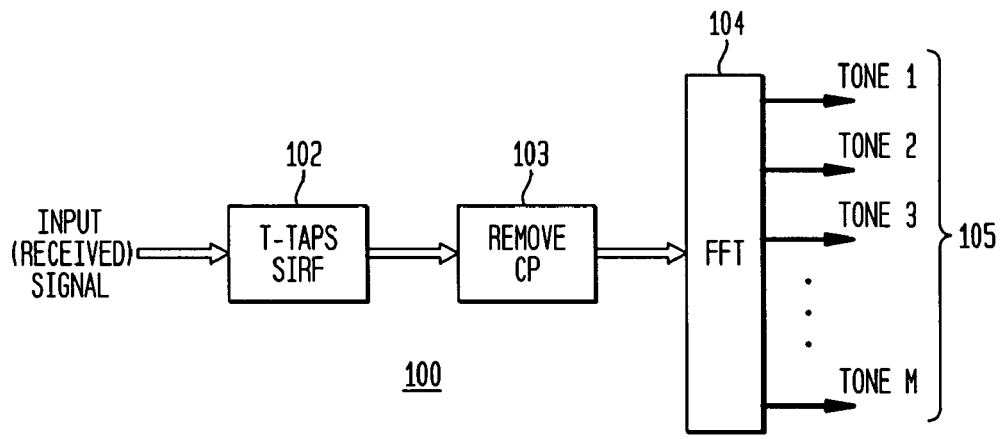
FIG. 1 illustrates a system of the prior art in block diagram form.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

There is described herein an equalization for DMT-based communication systems that offers distinct advantages when compared to the prior art. A system 100 known in the prior art is illustrated in block diagram form in FIG. 1. In the system of FIG. 1, an input signal 101 is received from the physical channel (telephone lines or wireless channels, for example). As a general principal, the input signal 101 would be received through an analog front end, processed through an analog to digital converter (ADC), and subjected to appropriate digital signal processing, although these elements are not shown in FIG. 1 for ease of reference.

The input signal 101 is applied to a time-domain equalizer 102, which in this case is implemented by means of a SIRF having "T" taps, where T is an integer. The equalized signal is then applied to a subsequent filter 103 that removes the cyclic prefix (CP). It is known in such systems that a cyclic prefix appended to the DMT symbol helps minimize the effects of dispersion caused by the physical channel.

Separation of the signal into its individual subbands, for which each tone represents a center frequency, is accomplished through Fast Fourier Transform (FFT) processing in the next block 104. Each of the subbands 105, labeled as Tone 1, Tone 2, etc., in FIG. 1, has been subjected to frequency-domain equalization.

Figure 2:
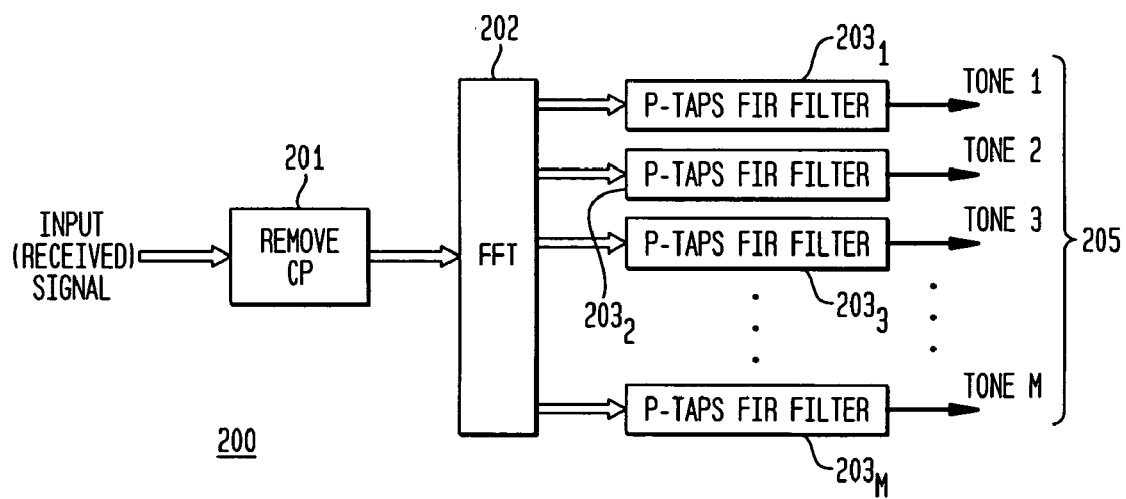
FIG. 2 illustrates, in block diagram form, an improved prior art structure that makes use of per-tone equalization.

An improved structure that makes use of per-tone equalization is shown in FIG. 2. In the system 200 of FIG. 2, the input signal 101 (with the same pre-processing suggested above with respect to the system of FIG. 1) is applied to a processing blocks 201 and 202 that remove the cyclic prefix and separates the input signal into subbands through the use of Fast Fourier Transformation. Each subband is then subjected to per-tone equalization in the frequency domain through FIR (finite impulse response) filters $203_1$, $203_2$, through $203_M$, in which each FIR filter 203 has "P" taps (where P is an integer), to produce a set 205 of equalized subband output signals.

Under a system that requires separate time-domain and frequency-domain equalization, one may designate $W=[w_1, w_2, \ldots w_T]^T$ and $D=[d_1, d_2, \ldots d_M]^T$ as, respectively, the coefficients of the SIRF with T-taps (W, for time-domain equalization) and the coefficient of the P-taps filters 203 (D, for frequency-domain equalization), respectively. T is the length of the SIRF and M is the number of tones or subbands.

Instead of determining W and D separately, as in traditional TEQ-based techniques, the scheme for per-tone equalization as shown in FIG. 2 requires that one determine $W_i = W*d_i$ ($i=1, 2, \ldots M$), that is, the coefficients of M combined P-tap FIR filters, by minimizing the following error (Equation 1):

$$\min_{W_i} |Y_{i,K \times T} * W_i - X_{i,K \times 1}|^2$$

where K stands for the number of training sequences, $Y_{i,K \times T}$ comes from the FFT processing of the received signals, and $X_{i,K \times 1}$ is the known training sequences.

Although this system of FIG. 2 provides a better and smoother SNR distribution function versus synchronization delay compared to the system of FIG. 1, some good features offered in traditional TEQ-based algorithms are lost when using this technique. For example, because one treats each tone separately, global optimization cannot be used. Moreover, there is no limit on the norm of the coefficients of the M combined P-tap filters. The dynamic range of these coefficients could be very large, which results in a complex hardware implementation of this scheme.

Figure 3:
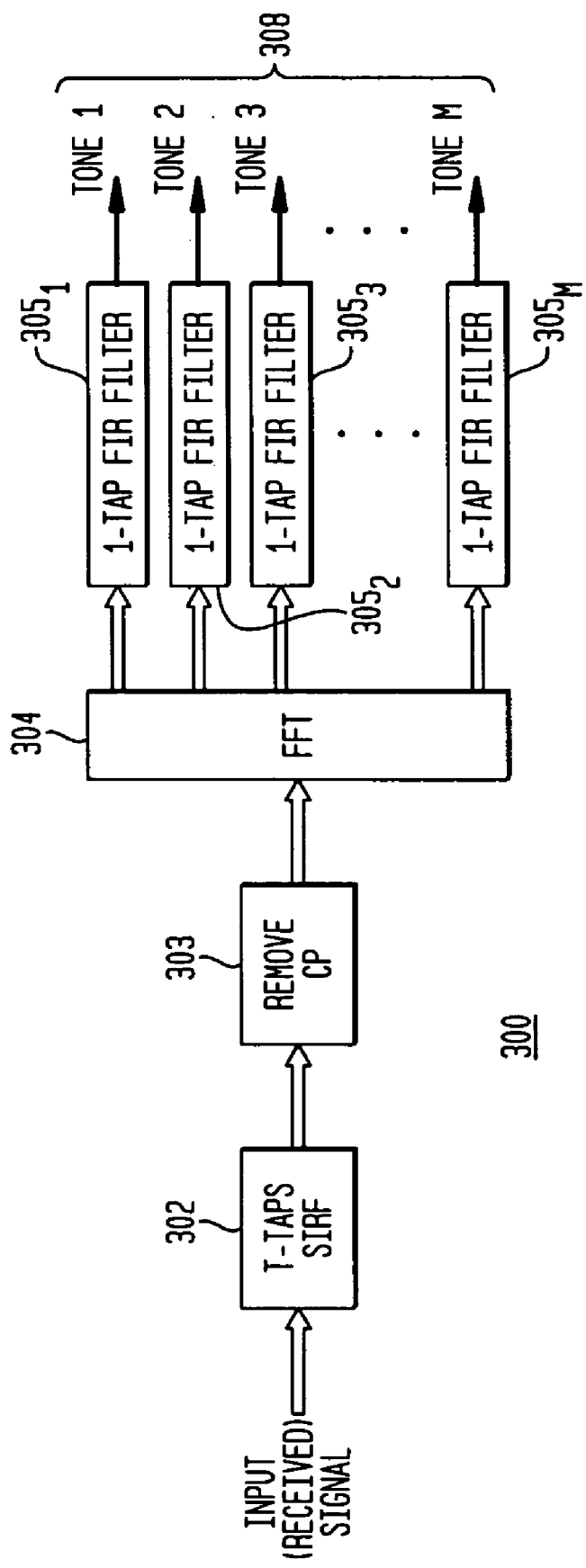
FIG. 3 illustrates, in block diagram form, a first equalization system in accordance with the present invention.

Because of these difficulties, a better scheme that retains the relative advantages of the available algorithms, while eliminating disadvantages, is provided in accordance with the present invention. An exemplary embodiment of the present invention, system 300, is illustrated in block diagram form in FIG. 3. The system 300 in accordance with the invention, applies the received (input) signal to a short impulse response filter (SIRF) 302 (having T-taps, where T is an integer), filters the output of the SIRF 302 through a subsequent filter 303 to remove the cyclic prefix, converts the filtered signal into frequency domain through FFT 304, and then applies the resulting frequency domain signals (one for each subband) to a set of M one-tap filters $305_1$, $305_2$, through $305_M$, where M is an integer representing the number of frequency bands or tones, to provide the collection of equalized output subbands or tones 308.

In order to overcome the disadvantages of the prior art, the system 300 in accordance with the present invention includes an equalization scheme that integrates both the global treatment and separate treatment of all used tones. A significant difference between the system 300 in accordance with the present invention and the system 200 illustrated in FIG. 2 is the introduction of a new variable $$C_i = \frac{1}{d_i}$$

and subsequent solution of the global optimization problem by constraining the norm of the coefficients of the SIRF to be unity, for use in TEQ algorithms, as follows (Equation 2):

$$\min_{W,C_i} \sum_{i=1}^{M} |Y_{i,K\times T} * W - C_i X_{i,K\times 1}|^2, \text{ and}$$

such that (Equation 3): $W^H W=1$, where "H" refers to a Hermitian Transpose.

Further differences between Equations 2 and 3, on the one hand, and Equation 1, on the other hand, may be summarized as follows. In Equation 1, one must find the coefficients of M combined P-tap FIR filters, such that the total unknown variables are thus M×P. For appropriate comparison, in the event P=T, such that filters 203 have the same number of taps as filter 302, then the number of coefficients which must be found for system 200 are M×T. But in the inventive system 300, using one T-tap filter and M one-tap filters, as a result the total unknown variables are M+T, significantly reducing the number of equalization variables which must be determined, and providing significantly improved performance. With the constraint of $W^H W=1$ being introduced in Equation 3, the dynamic range of all variables is thus limited, which provides ease of hardware implementation of the inventive system.

The inventive system further provides a solution to find the unknown coefficients W and $$C_i = \frac{1}{d_i}$$

from known transformed sequences $Y_{i,K\times T}$ and the training sequences $X_{i,K\times 1}$. One may obtain the least-squares solution (Equation 4):

$$C_i = (X_i^H X_i)^{-1} X_i^H Y_i W = \frac{X_i^H Y_i W}{X_i^H X}$$

where (Equations 5 and 6, respectively):

$$Y_{i,K\times T} = [Y_i^0, Y_i^1, \ldots Y^{K-1}]^T, X_{i,K\times 1} = [x_i^0, x_i^1, \ldots x_i^K]^T$$

$$(Y_i^k)^T = F_{i,1\times M} Y_{M\times T}$$

and where $F_{i,1\times M}$ is from the FFT operator and $Y_{M\times T}$ is the received signal matrix corresponding to the training sequences $X_{i,K\times 1}$.

Substituting Equation 4 into Equation 2, we have (Equation 7):

$$\min_{W,C_i} \sum_{i=1}^{M} |Y_i * W - C_i X_i|^2 = \min_{W} \sum_{i=1}^{M} \left| Y_i * W - X_i \frac{X_i^H Y_i W}{X_i^H X} \right|^2$$

-continued $$= \min_{W} \sum_{i=1}^{M} \left| \left( Y_i - X_i \frac{X_i^H Y_i}{X_i^H X} \right) W \right|^2$$

$$= \min_{W} \sum_{i=1}^{M} |A_i W|^2$$

$$= \min_{W} W^H \left( \sum_{i=1}^{M} A_i^H A_i \right) W$$

$$= \min_{W} W^H R W$$

where (Equation 8):

$$A_i = \left( I - X_i \frac{X_i^H}{X_i^H X} \right) Y_i,$$

I is the unity matrix, and (Equation 9):

$$R = \sum_{i=1}^{M} A_i^H A_i.$$

With the constraint of the norm of the coefficients, $W^H W=1$, the optimum coefficients W are derived from the eigenvector corresponding to the smallest eigenvalue of the matrix R. Once W is found, $C_i$ or $d_i$ may immediately be determined from Equation 4. In addition, no effort is wasted on the equalization of unused tones, because it is unnecessary to determine the coefficients for unused tones and one may simply allow related matrix variables to be zero ($A_i$=0).

A system in accordance with the present invention thus includes the following steps:
  (a) Calculating the transformed matrix $Y_{i,K\times T}$ according to the received samples via Equations 5 and 6;
  (b) Obtaining the matrix $A_i$ for each tone and the correlation-like matrix R according to the transformed matrix and the known training sequences via Equations 8 and 9.
  (c) Finding the coefficients W of the SRIF 302, which is the eigenvector corresponding to the smallest eigenvalue of the matrix R. In addition, for better performance, W may be formed by a vector in the minor subspace that is spanned by the eigenvectors corresponding to the several smaller eigenvalues of the matrix R; and
  (d) Finding the coefficients $d_i$ of the M one-tap FEQ filters 305 by using Equation 4 and the relationship $$C_i = \frac{1}{d_i}.$$

The present invention may be embodied as an integrated circuit ("IC"), or as a portion of an integrated circuit having other, additional components. For example, the inventive calculations may be performed by a processor, such as a digital signal processor, using memory such as random access memory, with the various filters 302, 303, and 305 implemented as known in the art of IC design and fabrication.

As the term processor is used herein, these implementations may include use of a single integrated circuit ("IC"), or may include use of a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed above, with associated memory, such as microprocessor memory or additional RAM, DRAM, SRAM, MRAM, ROM, EPROM or $E^2PROM$. A processor, with its associated memory, may be adapted or configured (via programming, FPGA interconnection, or hard-wiring) to perform the methodology of the invention, as discussed above. For example, the methodology may be programmed and stored, in a processor with its associated memory and other equivalent components,. as a set of program instructions (or equivalent configuration or other program) for subsequent execution when the processor is operative (i.e., powered on and functioning). Equivalently, the system 300 may be implemented in whole or part as FPGAs, custom ICs and/or ASICs, which also may be adapted, configured and/or hard-wired to implement the methodology of the invention.

Any memory utilized may be embodied in any number of forms, including within any data storage medium, memory device or other storage device, such as a magnetic hard drive, an optical drive, other machine-readable storage or memory media such as a floppy disk, a CDROM, a CD-RW, a memory integrated circuit, or memory portion of an integrated circuit (such as the resident memory within a processor IC), including without limitation RAM, FLASH, DRAM, SRAM, MRAM, FeRAM, ROM, EPROM or $E^2PROM$, or any other type of memory, storage medium, or data storage apparatus or circuit, which is known or which becomes known, depending upon the selected embodiment.

The system, methods and corresponding program implementations of the present invention may be embodied in any number of forms, including source code, object code, and configuration information. Such source code may be compiled into some form of instructions or object code (including assembly language instructions or configuration information for adaptive computing). The source code of the present invention may be embodied as any type of software, such as C, C++, C#, Java, or any other type of programming language which performs the functionality discussed above. The source code of the present invention and any resulting bit file (object code or configuration bit sequence) may be embodied within any tangible storage medium, such as within a memory (discussed above) or storage device for use by a computer, a workstation, any other machine-readable medium or form. For example, without limitation, a tangible medium storing computer readable software, or other machine-readable medium, may include a floppy disk, a CDROM, a CD-RW, a magnetic hard drive, an optical drive, a quantum computing storage medium or device, a transmitted electromagnetic signal (e.g., used in internet downloading), or any other type of data storage apparatus or medium.

As a consequence, a "construct" or "program construct", as used herein, means and refers to use of any programming language, of any kind, with any syntax or signatures, which provide or can be interpreted or compiled to provide, when executed, the methodology of the present invention. For example, program constructs may be code or other software used to program a processor to implement the equalization of the present invention, or configuration information (discussed below) used to adapt an adaptive execution unit to implement the equalization of the present invention.

Figure 4:
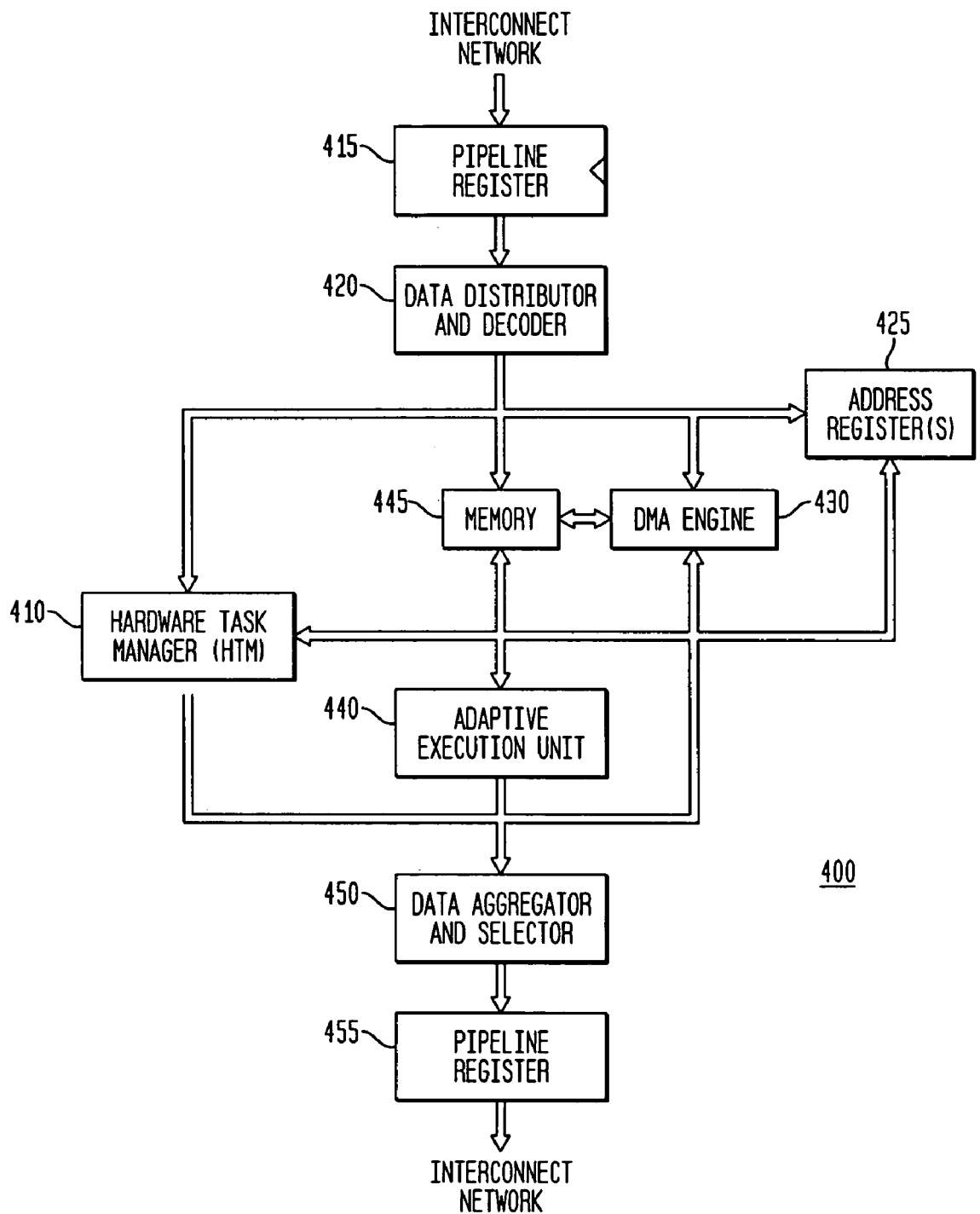
FIG. 4 is a block diagram illustrating a second equalization system in accordance with the present invention.

FIG. 4 is a block diagram illustrating a prototypical node or matrix 400 in which the equalization system and method of the present invention may be incorporated. Such a prototypical node 400 is described in detail in Paul Master et al., U.S. patent application Ser. No. 10/384,486, filed Mar. 7, 2003, published Aug. 14, 2003 as U.S. Publication No. US-2003-0154357-A1, commonly assigned with this invention, and incorporated by reference herein. The node 400 is connected to other nodes through a matrix interconnection network (not separately illustrated). The prototypical node 400 includes a fixed (and non-reconfigurable) "node wrapper", an adaptive (reconfigurable) execution unit 440, and a memory 445 (which also may be variable). This fixed and non-reconfigurable "node wrapper" includes an input pipeline register 415, a data decoder and distributor 420, a hardware task manager 410, an address register 425 (optional), a DMA engine 430 (optional), a data aggregator and selector 450, and an output pipeline register 455. These components comprising the node wrapper are generally common to all nodes, and are comprised of fixed architectures (i.e., application-specific or non-reconfigurable architectures). As a consequence, the node 400 is a unique blend of fixed, non-reconfigurable node wrapper components, memory, and the reconfigurable components of an adaptive execution unit 440 (which, in turn, are comprised of fixed computational elements and an interconnection network).

Various nodes 400, in general, will have a distinctive and variably-sized adaptive execution unit 440, tailored for one or more particular applications or algorithms, and a memory 445, also implemented in various sizes depending upon the requirements of the adaptive execution unit 440. Each adaptive execution unit 440 is reconfigurable in response to configuration information. As a consequence, the present equalization system 300 may be embodied in an adaptive execution, which is programmed or adapted through configurable interconnections for a plurality of functions, with each such function instantiated through corresponding configuration information.

As mentioned above, the adaptive execution unit 440 is comprised of a plurality of computational elements, such as IC components designed or adapted for addition, multiplication, complex multiplication, subtraction, configuration, reconfiguration, control, input, output, and field programmability, for example. Depending upon the selected embodiment, other computational elements may be adapted or designed such that when configured, they provide highly efficient performance of specific algorithms, such as for the FFTs of FFT 304.

Not separately illustrated in FIG. 4 is an interconnection network, which is operable at two different levels: first the interconnection network provides reconfigurable interconnections between and among the various nodes 400 and any other connectable systems or ICs; second, the interconnection network provides reconfigurable interconnections between and among the computational elements forming the adaptive execution unit 440. The interconnection network includes routing elements (e.g., such as round-robin, token ring, cross point switches, or other arbiter elements), multiplexing, and other switching components, and a network (or path) for real time data transfer and transmission of control (configuration) information. In response to configuration information, the interconnection network is operative in real time to adapt (configure and reconfigure) the plurality of computational elements for a plurality of different functional modes, including linear algorithmic operations, non-linear algorithmic operations, finite state machine operations, memory operations, and bit-level manipulations. For the purposes of the present invention, configuration information can be developed to provide appropriate routing, multiplexing and switching settings for the interconnection network to adapt a plurality of computational elements forming the adaptive execution unit 440 to form the components discussed above (T-tap SIRF 302, CP filter 303, FFT 304, and M one-tap filters 305), and to also execute the inventive function discussed above for the determination of the coefficients for the T-taps of the SIRF 302, and the coefficients of M one-tap filters 305.

This configuration of the plurality of computational elements, as noted above, is particularly adaptable to perform the processes that would otherwise require a RISC computation engine dedicated to a particular process, or even hard-wired control of processes that must be executed repetitively or recursively. The algorithms necessary for filter implementation in the present invention fall neatly into these categories, and consequently the processing blocks of FIG. 3 may be implemented within a node 400 (or multiple nodes, as required), as shown in FIG. 4, in addition to the processor, ASIC etc. embodiments discussed above.

There has been described herein an equalization for OFDM and DMT-based communication systems that offers distinct advantages when compared with the prior art. From the foregoing, it will be observed that numerous variations and modifications may be effected without departing from the spirit and scope of the novel concept of the invention. It is to be understood that no limitation with respect to the specific methods and systems illustrated herein is intended or should be inferred. It is, of course, intended to cover by the appended claims all such modifications as fall within the scope of the claims.

What is claimed is:

1. An equalization method for communication having frequency division multiplexing using a plurality of frequency subbands, the method comprising:
   (a) performing time domain equalization on a received digital signal using a first plurality of coefficients to form a time domain equalized signal in a T-tap filter, where T is the number of short impulse response filter (SIRF) taps within the filter;
   (b) filtering the time domain equalized signal to remove a cyclic prefix;
   (c) converting the time domain equalized signal into a frequency domain signal;
   (d) separating the frequency domain signal into the plurality of frequency subbands;
   (e) performing frequency domain equalization on each frequency subband of the plurality of frequency subbands using a second plurality of coefficients, utilizing M one-tap filters, where M is the number of frequency subbands in the plurality of frequency sidebands, the second plurality of coefficients having one coefficient for each frequency subband of the plurality of frequency subbands; and
   (f) jointly determining in an integrated calculation the first plurality of coefficients and the second plurality of coefficients, the total unknown equalization variables being M+T.

2. The equalization method of claim 1, further comprising:
   determining the first plurality of coefficients in the form of a matrix W and the second plurality of coefficients in the form of a matrix D, based on a known transmitted training sequence $X_i$ and a received and frequency transformed training sequence $Y_i$ by constraining the first plurality of coefficients W to $W^H W=1$, where H is a Hermitian Transpose.

3. The equalization method of claim 2, further comprising:
   determining the first plurality of coefficients W as an eigenvector corresponding to a smallest eigenvalue of a matrix R, where $$R = \sum_{i=1}^{M} A_i^H A_i \text{ and}$$

$$A_i = \left(I - X_i \frac{X_i^H}{X_i^H X}\right) Y_i,$$

where I is the unity matrix.

4. The equalization method of claim 3, wherein the first plurality of coefficients W is determined as a vector in a minor subspace spanned by a plurality of eigenvectors corresponding to a plurality of comparatively smaller eigenvalues of the matrix R.

5. The equalization method of claim 3, further comprising:
   determining the second plurality of coefficients D from a third plurality of coefficients in the form of a matrix C, where $$C_i = \frac{1}{d_i} \text{ and}$$

$$C_i = (X_i^H X_i)^{-1} X_i^H Y_i W = \frac{X_i^H Y_i W}{X_i^H X}.$$

6. The equalization method of claim 3, further comprising minimizing over W a function comprising $W^H R W$.

7. The equalization method of claim 1, further comprising:
   (g) not determining a coefficient of the second plurality of coefficients which corresponds to a frequency subband which is not utilized in the communication.

8. The equalization method of claim 1, wherein step (a) is performed by a short impulse response filter having a plurality of taps corresponding to the first plurality of coefficients.

9. The equalization method of claim 1, wherein step (e) is performed by a plurality of one-tap finite impulse response filters corresponding to the second plurality of coefficients.

10. The equalization method of claim 1, wherein the frequency division multiplexing is discrete multi-tone.

11. The equalization method of claim 1, wherein the frequency division multiplexing is orthogonal frequency-division multiplexing.

12. An equalization system for communication having frequency division multiplexing using a plurality of frequency subbands, the system comprising:
   a short impulse response filter having a plurality of taps corresponding to a first plurality of coefficients, the short impulse response filter adapted to convert a received signal to a time domain equalized signal;
   a fast fourier transformer coupled to the short impulse response filter to convert the time domain equalized signal into a frequency domain signal and to separate the frequency domain signal into the plurality of frequency subbands;
   a plurality of one-tap impulse response filters coupled to the fast fourier transformer and adapted to provide frequency domain equalization of the plurality of frequency subbands, the plurality of one-tap impulse response filters corresponding to the plurality of frequency subbands and having a corresponding second plurality of coefficients, the second plurality of coefficients having one coefficient for each frequency subband of the plurality of frequency subbands; and a processor coupled to the short impulse response filter and the plurality of one-tap impulse response filters, the processor adapted to jointly determine in an integrated calculation the first plurality of coefficients and the second plurality of coefficients, wherein the processor is further adapted to determine the first plurality of coefficients in the form of a matrix W and the second plurality of coefficients in the form of a matrix D, based on a known transmitted training sequence $X_i$ and a received and frequency transformed training sequence $Y_i$ by constraining the first plurality of coefficients W to $W^H W=1$, where H is a Hermitian Transpose.

13. The equalization system of claim 12, wherein the processor is further adapted to determine the first plurality of coefficients W as an eigenvector corresponding to a smallest eigenvalue of a matrix R, where $$R = \sum_{i=1}^{M} A_i^H A_i \text{ and } A_i = \left(I - X_i \frac{X_i^H}{X_i^H X}\right) Y_i,$$

where I is the unity matrix.

14. The equalization system of claim 13, wherein the processor is further adapted to determine the first plurality of coefficients W as a vector in a minor subspace spanned by a plurality of eigenvectors corresponding to a plurality of comparatively smaller eigenvalues of the matrix R.

15. The equalization system of claim 13, wherein the processor is further adapted to determine the second plurality of coefficients D from a third plurality of coefficients in the form of a matrix C, where $$C_i = \frac{1}{d_i} \text{ and } C_i = (X_i^H X_i)^{-1} X_i^H Y_i W = \frac{X_i^H Y_i W}{X_i^H X}.$$

16. The equalization system of claim 13, wherein the processor is further adapted to minimize over W a function comprising $W^H RW$.

17. The equalization system of claim 12, wherein the processor is further adapted to not determine a coefficient of the second plurality of coefficients which corresponds to a frequency subband not utilized in the communication.

18. The equalization system of claim 12, wherein the frequency division multiplexing is discrete multi-tone.

19. The equalization system of claim 12, wherein the frequency division multiplexing is orthogonal frequency-division multiplexing.

20. An equalization system for communication having frequency division multiplexing using a plurality of frequency subbands, the system comprising:

a plurality of computational elements, the plurality of computational elements including a first computational element and a second computational element, the first computational element having a first fixed architecture and the second computational element having a second fixed architecture, the first fixed architecture being different than the second fixed architecture;

an interconnection network coupled to the plurality of computational elements, the interconnection network operative in response to first configuration information to configure the plurality of computational elements as a short impulse response filter having a plurality of taps corresponding to a first plurality of coefficients and adapted to convert a received signal to a time domain equalized signal; the interconnection network further operative in response to second configuration information to configure the plurality of computational elements for a fast fourier transform functional mode to convert the time domain equalized signal into a frequency domain signal and to separate the frequency domain signal into the plurality of frequency subbands; and the interconnection network further operative in response to third configuration information to configure the plurality of computational elements, to provide frequency domain equalization of the plurality of frequency subbands, as a plurality of one-tap impulse response filters corresponding to the plurality of frequency subbands and having a corresponding second plurality of coefficients, wherein the second plurality of coefficients have one coefficient for each frequency subband of the plurality of frequency subbands; and a processor coupled to the short impulse response filter and the plurality of one-tap impulse response filters, the processor adapted to jointly determine in an integrated calculation the first plurality of coefficients and the second plurality of coefficients, the total unknown equalization variables being M+T wherein M is the number of frequency subbands in the plurality of frequency sidebands of performing frequency domain equalization and wherein T is the number of short impulse response filter taps within the filter of performing time domain equalization.

21. The equalization system of claim 20, wherein the interconnection network is further operative in response to fifth configuration information to determine the first plurality of coefficients in the form of a matrix W and the second plurality of coefficients in the form of a matrix D, based on a known transmitted training sequence $X_i$ and a received and frequency transformed training sequence $Y_j$, by constraining the first plurality of coefficients W to $W^H W=1$, where H is a Hermitian Transpose.

22. The equalization system of claim 21, wherein the interconnection network is further operative in response to sixth configuration information to determine the first plurality of coefficients W as an eigenvector corresponding to a smallest eigenvalue of a matrix R, where $$R = \sum_{i=1}^{M} A_i^H A_i \text{ and } A_i = \left(I - X_i \frac{X_i^H}{X_i^H X}\right) Y_i,$$

where I is the unity matrix.

23. The equalization system of claim 22, wherein the interconnection network is further operative in response to seventh configuration information to determine the first plurality of coefficients W as a vector in a minor subspace spanned by a plurality of eigenvectors corresponding to a plurality of comparatively smaller eigenvalues of the matrix R.

24. The equalization system of claim 22, wherein the interconnection network is further operative in response to eighth configuration information to determine the second plurality of coefficients D from a third plurality of coefficients in the form of a matrix C, where $$C_i = \frac{1}{d_i} \text{ and } C_i = (X_i^H X_i)^{-1} X_i^H Y_i W = \frac{X_i^H Y_i W}{X_i^H X}.$$

25. The equalization system of claim 22, wherein the interconnection network is further operative in response to ninth configuration information to minimize over W a function comprising $W^H RW$.

26. The equalization system of claim 20, wherein the interconnection network is further operative in response to tenth configuration information to not determine a coefficient of the second plurality of coefficients which corresponds to a frequency subband not utilized in the communication.

27. The equalization system of claim 20, wherein the frequency division multiplexing is discrete multi-tone.

28. The equalization system of claim 20, wherein the frequency division multiplexing is orthogonal frequency-division multiplexing.

29. A computer readable medium including instructions that, when executed by a computer, cause the computer to jointly determine a first plurality of coefficients for time domain equalization and a second plurality of coefficients for frequency domain equalization, the second plurality of coefficients having one coefficient for each frequency subband of a plurality of frequency subbands of a communication having frequency division multiplexing, by performing the steps of:

determining the first plurality of coefficients in the form of a matrix W and the second plurality of coefficients in the form of a matrix D, based on a known transmitted training sequence $X_i$ and a received and frequency transformed training sequence $Y_i$ by constraining the first plurality of coefficients W to $W^H W=1$, where H is a Hermitian Transpose;

determining the first plurality of coefficients W as an eigenvector corresponding to a smallest eigenvalue of a matrix·R, where where $$R = \sum_{i=1}^{M} A_i^H A_i \text{ and } A_i = \left(I - X_i \frac{X_i^H}{X_i^H X}\right) Y_i,$$

where I is the unity matrix; and determining the second plurality of coefficients D from a third plurality of coefficients in the form of a matrix C, where $$C_i = \frac{1}{d_i} \text{ and}$$

$$C_i = (X_i^H X_i)^{-1} X_i^H Y_i W = \frac{X_i^H Y_i W}{X_i^H X}.$$

30. An equalization method for a digital communication receiver utilizing discrete multi-tone (DMT)-modulation with M subbands, the method comprising the steps of:

(a) subjecting a received digital signal to time-domain equalization through a short impulse response filter having T-taps and a coefficient matrix W wherein W is defined as $W=[w_1, w_2, \ldots w_T]^T$;

(b) converting the time domain equalized signal into a frequency domain signal having M subband components;

(c) providing frequency-domain equalization through a set of M one-tap FIR filters having a coefficient matrix D wherein D is defined as $D=[d1, d2, \ldots d_M]^T$, with a separate one-tap FIR filter implemented for each of the M subbands used in transmission of the digital signal;

(d) using a known transmitted training sequence $X_i$ and a received and frequency transformed training sequence $Y_i$, and constraining the first plurality of coefficients W to $W^H W=1$, where H is a Hermitian Transpose:

determining the first plurality of coefficients W as an eigenvector corresponding to a smallest eigenvalue of a matrix R, where $$R = \sum_{i=1}^{M} A_i^H A_i \text{ and } A_i = \left(I - X_i \frac{X_i^H}{X_i^H X}\right) Y_i,$$

where I is the unity matrix; and determining the second plurality of coefficients D from a third plurality of coefficients in the form of a matrix C, where $$C_i = \frac{1}{d_i} \text{ and } C_i = (X_i^H X_i)^{-1} X_i^H Y_i W = \frac{X_i^H Y_i W}{X_i^H X}; \text{ and}$$

(e) computing a maximum of M+T coefficients of equalization, with no coefficients computed for unused subbands, where M is an integer representing the number of tones, and T represents the number of short impulse response filter (SIRF) taps.

* * * * *

UNITED STATES PATENT AND TRADEMARK OFFICE
CERTIFICATE OF CORRECTION

PATENT NO. : 7,433,398 B2 Page 1 of 1
APPLICATION NO. : 10/889530
DATED : October 7, 2008
INVENTOR(S) : Luo et al.

It is certified that error appears in the above-identified patent and that said Letters Patent is hereby corrected as shown below:

In Column 13, Line 41 please replace "matrix·R where where" with -- matrix R where --.

In Column 14, Line 28 please replace "Was" with -- W as --.

Signed and Sealed this

Seventeenth Day of February, 2009

JOHN DOLL
*Acting Director of the United States Patent and Trademark Office*